(12) United States Patent
Shizuku

(10) Patent No.: US 11,760,129 B2
(45) Date of Patent: Sep. 19, 2023

(54) TIRE

(71) Applicant: BRIDGESTONE CORPORATION, Tokyo (JP)

(72) Inventor: Takahisa Shizuku, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 783 days.

(21) Appl. No.: 16/757,785

(22) PCT Filed: Oct. 24, 2018

(86) PCT No.: PCT/JP2018/039534
§ 371 (c)(1),
(2) Date: Apr. 21, 2020

(87) PCT Pub. No.: WO2019/082939
PCT Pub. Date: May 2, 2019

(65) Prior Publication Data
US 2020/0290403 A1   Sep. 17, 2020

(30) Foreign Application Priority Data

Oct. 25, 2017 (JP) .................... 2017-206508

(51) Int. Cl.
*B60C 9/04* (2006.01)
*C08L 9/06* (2006.01)
*C08L 23/06* (2006.01)
*C08L 23/16* (2006.01)
*C08L 23/20* (2006.01)
*C08K 3/04* (2006.01)

(52) U.S. Cl.
CPC ............. *B60C 9/04* (2013.01); *C08L 9/06* (2013.01); *C08L 23/06* (2013.01); *C08L 23/16* (2013.01); *C08L 23/20* (2013.01); *B60C 2009/0475* (2013.01); *C08K 3/04* (2013.01)

(58) Field of Classification Search
CPC .. C08L 9/06; C08L 23/06; C08L 23/16; C08L 23/20; B60C 9/04; B60C 2009/0475; C08K 3/04
See application file for complete search history.

(56) References Cited

U.S. PATENT DOCUMENTS

| | | |
|---|---|---|
| 5,139,874 A | 8/1992 | Starinshak et al. |
| 6,334,293 B1 | 1/2002 | Poethke et al. |
| 2001/0011569 A1 | 8/2001 | Miyazaki et al. |
| 2014/0311120 A1 | 10/2014 | Pottier et al. |
| 2015/0053323 A1 | 2/2015 | Harada et al. |
| 2015/0211176 A1 | 7/2015 | Suefuji |
| 2019/0329593 A1 | 10/2019 | Shizuku et al. |
| 2020/0055340 A1 | 2/2020 | Shizuku et al. |
| 2021/0071360 A1 | 3/2021 | Ando |

FOREIGN PATENT DOCUMENTS

| | | |
|---|---|---|
| BE | 900175 A | 11/1984 |
| CN | 104144798 A | 11/2014 |
| DE | 1027539 B1 | 4/1958 |
| EP | 3 730 692 A1 | 10/2020 |
| JP | 60-105698 U | 7/1985 |
| JP | 60-246886 A | 12/1985 |
| JP | 1-98194 U | 6/1989 |
| JP | 5-125675 A | 5/1993 |
| JP | 7-109685 A | 4/1995 |
| JP | 7-189149 A | 7/1995 |
| JP | 10-35221 A | 2/1998 |
| JP | 11-28906 A | 2/1999 |
| JP | 2001-214387 A | 8/2001 |
| JP | 2001-234444 A1 | 8/2001 |
| JP | 2002-538327 A | 11/2002 |
| JP | 2010-53495 A | 3/2010 |
| JP | 2014-51758 A | 3/2014 |
| JP | 2014156667 A * | 8/2014 |
| JP | 2015-502463 A | 1/2015 |
| JP | 2018-104851 A | 7/2018 |
| KR | 100437321 B1 * | 6/2004 |
| WO | 00/52254 A1 | 9/2000 |
| WO | 2015/173143 A1 | 11/2015 |
| WO | 2017/222046 A1 | 12/2017 |

(Continued)

OTHER PUBLICATIONS

English machine translation for JP 2014-156667 (Year: 2014).*
English machine translation for KR 100437321 (Year: 2004).*
International Search Report dated Jan. 29, 2019 from the International Searching Authority in International Application No. PCT/JP2018/039534.

(Continued)

*Primary Examiner* — Angela C Scott
(74) *Attorney, Agent, or Firm* — Sughrue Mion, PLLC

(57) ABSTRACT

Provided is a tire in which a steel cord applied to a carcass ply has improved corrosion resistance to water penetration, fretting resistance, and cord untwisting resistance. Provided is a tire including a carcass ply (1) as a skeleton. The carcass ply is reinforced by a steel cord including no wrapping filament. The steel cord is composed of a plurality of steel filaments having 3 or more core filaments, at least a part of the surface of each of the plurality of steel filaments is coated with a resin material containing at least an ionomer, and when a resin component contained in the resin material is composed of a single resin, the melting point of the resin material is 150° C. or less, and when the resin component is composed of a composition containing two or more resins, the softening point of the resin material is 150° C. or less.

16 Claims, 3 Drawing Sheets

(56) References Cited

FOREIGN PATENT DOCUMENTS

WO 2018/199122 A1 11/2018

OTHER PUBLICATIONS

Extended European Search Report dated Jun. 10, 2021 in European Application No. 18870821.8.
Search Report dated Sep. 24, 2021 in Chinese Application No. 201880068935.X.

* cited by examiner

TIRE

CROSS REFERENCE TO RELATED APPLICATIONS

This application is a National Stage of International Application No. PCT/JP2018/039534, filed Oct. 24, 2018, claiming priority to Japanese Patent Application No. 2017-206508, filed Oct. 25, 2017.

TECHNICAL FIELD

The present invention relates to a tire, and more particularly, to a tire whose carcass ply is improved.

BACKGROUND ART

Usually, steel cords are used for carcass plies of medium and large tires. The carcass ply is an important member that maintains the internal pressure of a tire as a pressure vessel and ensures the durability of the tire. Currently, as a steel cord for use in a carcass ply, a cord having a compact structure (closest-packed structure) such as a 12 cc structure, in which steel filaments are arranged in such a manner to be closest-packed in a cross section of the cord, is mainly used.

In the above-described cord structure, usually, a wrapping filament (also referred to as a spiral filament or the like) wound spirally along the longitudinal direction of a cord is provided outside a cord body in order to prevent a cord cross section from being disarranged when the tire is bent. Examples of a secondary effect of the wrapping filament also include an effect of preventing a flared cord-end (an untwisted cord-end). Specifically, since the cord body is constrained by a wrapping filament, even when the steel cord is cut during tire manufacturing, a twist of the cord body is not loosened, so that there is an advantage that a cut end of the steel cord can be easily passed through a guide portion or the like.

For example, as a technique for improving a rupture life when a large bending moment is input, without using a wrapping filament, Patent Document 1 discloses a technique in which, by making the tensile strength of all filaments in a steel cord of 3+ from 7 to 8 structure equal to or more than a predetermined value and making the core filament diameter equal to or larger than the sheath filament diameter, the rubber penetration is improved, and a twist of the cord is prevented from being loosened with the holding force of a sheath using the adhesive force between the sheath and the rubber.

RELATED ART DOCUMENT

Patent Document

Patent Document 1 JPH07-109685A (Claims, paragraphs [0002] to [0006], and the like)

SUMMARY OF THE INVENTION

Problems to be Solved by the Invention

Problems with a cord having the above-described compact structure include: a possibility of progress of corrosion to the entire carcass ply when water infiltrates from outside due to an external damage such as tire cut since there am voids between filaments, which may reduce the tire strength, and a possibility of fretting between the cord body and the wrapping filament due to repeated input by rolling the tire. In terms of cost, the above-described compact structure involves an additional step of winding a wrapping filament around a cord body and thus has a problem that causes a cost increase.

In order to solve the problems, a cord structure such as a 3+8 structure (rubber penetration structure) is also used that provides a gap between filaments in a cord cross section so that the rubber can infiltrate into the cord cross section during vulcanization. Although this structure can also suppress water flow at the time of external damage, as shown in FIG. 5, for example, even in a case using a cord having a 3+8 structure, there is still a gap in a 1×3 core inside 40 and therefore a possibility of water penetration corrosion in the longitudinal direction of the cord still remains. There also have been problems that the gauge pressure in such a tire increases compared with a case of a closest-packed structure, and that such a tire has to be designed in consideration of the end count of plies. Although there is a technology described in Patent Document 1 that addresses these problems, in particular, the realization of a technique that can further improve the corrosion resistance to water penetration, the fretting resistance, and the cord untwisting resistance of a steel cord applied to carcass plies has been desired with the recent increase in required performance for tires.

Accordingly, an object of the present invention is to provide a tire in which the corrosion resistance to water penetration, the fretting resistance, and the cord untwisting resistance of a steel cord applied to a carcass ply is improved.

Means for Solving the Problems

The present inventor intensively studied and found that the following structure can solve the above-described problems, thereby completing the present invention.

Specifically, the present invention relates to a tire including a carcass ply as a skeleton, wherein the carcass ply is reinforced by a steel cord including no wrapping filament, the steel cord is composed of a plurality of steel filaments including 3 or more core filaments, at least a part of a surface of each of the plurality of steel filaments is coated with a resin material containing at least an ionomer, and when a resin component contained in the resin material is composed of a single resin, a melting point of the resin material is 150° C. or less, and when the resin component is composed of a composition containing two or more resins, a softening point of the resin material is 150° C. or less.

The term "resin" herein conceptually includes a thermoplastic resin including a thermoplastic elastomer and a thermosetting resin including a thermosetting elastomer, and does not include a vulcanized rubber.

In the tire of the present invention, the steel cord includes a core portion composed of the core filaments and at least one sheath layer arranged on an outer periphery of the core portion, and when a region occupied by portions other than the steel filaments in a region surrounded by a line connecting centers of respective sheath filaments constituting an outermost sheath layer in a cord cross section orthogonal to a cord longitudinal direction is defined as a gap region, a filling rate indicating a ratio of the resin material to the gap region is preferably from 52% to 120%.

In the tire of the present invention, the resin material preferably contains an inorganic filler in an amount of from 0.1 parts by mass to 30 parts by mass based on 100 parts by mass of a resin component, and more preferably, the inorganic filler is carbon black, and suitably, the grade of the carbon black is GPF.

Furthermore, in the tire of the present invention, preferably, the resin material further includes a resin modified with an acid anhydride, and more preferably, the modified resin is a maleic acid-modified resin and/or a dimer acid-modified resin. Still furthermore, in the tire of the present invention, preferably, the mass ratio of the maleic acid-modified resin to the ionomer is from 4:6 to 6:4.

Effects of the Invention

According to the present invention, a tire in which the corrosion resistance to water penetration, the fretting resistance, and the cord untwisting resistance of a steel cord applied to a carcass ply is improved can be provided.

MODE FOR CARRYING OUT THE INVENTION

Hereinafter, embodiments of the present invention will be described in detail with reference to the drawings.

Figure 1:
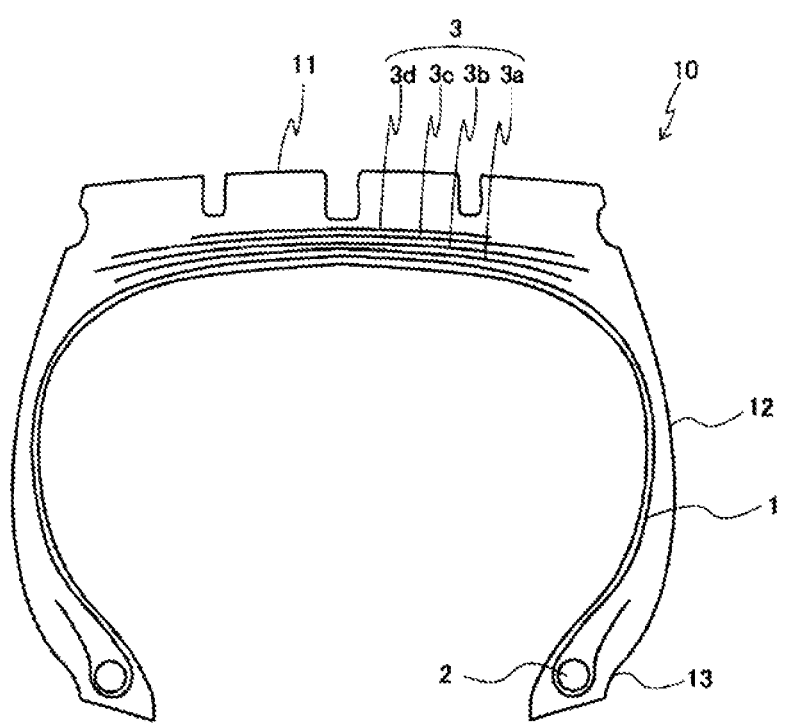
FIG. 1 is a cross-sectional view in the width direction showing an example of a tire of the present invention.

FIG. 1 is a cross-sectional view in the width direction showing an example of a tire of the present invention. In FIG. 1, a tire 10 of the present invention includes a tread portion 11 forming a ground contact portion, a pair of sidewall portions 12 extending continuously inward in the tire radial direction from both sides thereof, and a pair of bead portions 13 each continuous from the inner peripheral side of each of the sidewall portions 12. The tread portion 11, the sidewall portions 12, and the bead portions 13 are reinforced by a carcass ply 1 toroidally extending between the pair of bead portions 13.

The carcass ply 1 is a member forming a skeleton of a tire, and at least one, for example, from one to six carcass plies are arranged. In the tire 10, a bead core 2 is embedded in each of the pair of bead portions 13, and the carcass ply 1 is folded around the bead core 2 from the inside to the outside in the tire radial direction and is locked, however the method of locking the carcass ply 1 is not limited thereto.

Figure 2:
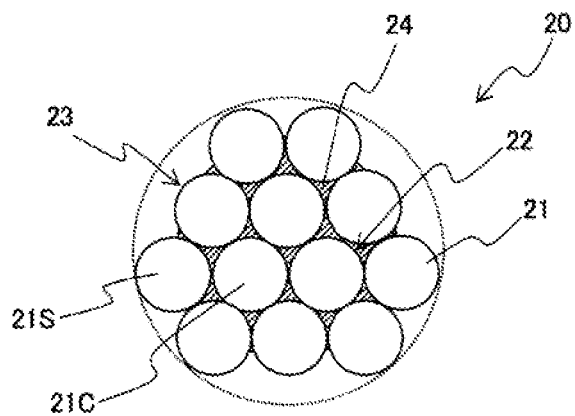
FIG. 2 is a cross-sectional view in the width direction of an example of a steel cord according to the present invention.

In the present invention, a specific steel cord described in detail below is used as a ply cord used for reinforcing the carcass ply 1. FIG. 2 shows a cross-sectional view in the width direction of an example of the steel cord according to the present invention. In FIG. 2, a steel cord 20 has a compact structure (closest-packed structure) of a 12 cc structure, and has twelve steel filaments 21 arranged without gaps in the cord cross section. The steel cord 20 includes a core portion 22 composed of three core filaments 21C, and a single sheath layer 23 composed of nine sheath filaments 21S arranged on the outer periphery thereof.

As illustrated, the steel cord 20 as the ply cord according to the present invention does not include a wrapping filament conventionally wound around the outer periphery of the cord body. As illustrated, in the steel cord 20 according to the present invention, it is important that at least a part of the surface of the steel filament 21 is coated with a specific resin material 24. Since at least a part of the surface of the plurality of steel filaments 21 is coated with the resin material 24, the gap between the filaments in the cord can be reduced to block the water flow path, thereby suppressing the progress of corrosion due to water flow when the tire is externally damaged. Since the steel filaments 21 are constrained to each other by the resin material 24, the shape of the steel filaments in the tire is maintained without a wrapping filament, which can suppress disarrangement of the cord cross section and loosening of twists of the cord, and since the steel cord does not include a wrapping filament, a fretting problem can be solved and manufacturing costs can be reduced due to the reduction of manufacturing steps.

In the present invention, the resin material 24 is a resin material containing at least an ionomer and having a melting point of 150° C. or less when a resin component contained is composed of a single resin or a softening point of 150° C. or less when the resin component contained is composed of a composition containing two or more resins. As described below, in the present invention, the steel cord is formed by melting a resin material at the time of tire vulcanization and coating a steel filament with the melted resin material, and when the softening point or melting point of the resin material exceeds 150° C., the resin material is hardly softened at the time of vulcanization of the tire, and the molding workability deteriorates. The softening point or melting point of the resin material needs to be 150° C. or lower, and suitably 140° C. or lower, and more suitably 120° C. or lower, and suitably 80° C. or higher, and more suitably 90° C. or higher. When the softening point or melting point of the resin material is too low, the resin material is likely to soften due to heat generation during traveling, and a steel filament may be easily loosened, which is not preferable. Here, the softening point refers to a value measured using a softening point test method described in JIS K 7206 (1999).

As described below, in the present invention, the resin material is twisted with a steel filament in a state of a resin filament and embedded in a green tire. Therefore, when twisting a steel filament and a resin filament having completely different characteristics from each other, it is necessary to prevent the resin filament from being broken. At the same time, the resin filament must be made of a resin material that has favorable adhesion to the surface of a steel filament after softening and is capable of preventing an interface with the steel filament from peeling off to form a water infiltration path, and that can prevent an interface with rubber or the like that coats a steel cord from peeling off and forming a water infiltration path. Accordingly, in the present invention, it is preferable to use a thermoplastic resin as a resin component of a resin material, and a resin material containing at least an ionomer is used as the resin component. By containing an ionomer, the surface of a resin filament can be smoothed, and when twisted with a steel filament, the slip property between the steel filament and the resin filament can be improved. As a result, breakage of the resin filament can be prevented, the waterproofness of the steel cord can be improved, and at the same the slip property of the resin filament in a twisting machine can be improved.

In the present invention, the resin material only needs to contain at least an ionomer. For example, the resin component of the resin material may be a resin filament composed of only an ionomer.

Here, the ionomer is a thermoplastic resin containing an olefin (covalent bond) as a main component and an ionic bond (crosslinking) between long chains, which is characterized by having a low density, a high toughness and a high resilience, and being excellent in grease resistance and solvent resistance. A carboxyl group is used as the anion portion of the ion bridge, and a metal ion such as sodium ion, potassium ion, magnesium ion, or zinc ion is used as the cation portion. The ionomer resin can be obtained, for example, by cross-linking between molecular chains (between carboxyl groups in the molecular chain) of a copolymer of ethylene and methacrylic acid with a metal ion as described above.

Specific examples of the ion tier include a zinc ion neutralized ionomer such as Himilan 1554, Himilan 1557, Himilan 1650, Himilan 1652, Himilan 1702, Himilan 1706, or Himilan 1855 manufactured by Du Pont-Mitsui Polychemicals Co., Ltd. and a sodium ion neutralized ionomer such as Himilan 1555, Himilan 1601, Himilan 1605, Himilan 1707, Himilan 1856, or AM7331. Further examples thereof include a lithium ion neutralized ionomer such as Surlyn 7930 and a sodium ion neutralized ionomer such as Surlyn 8120 manufactured by DuPont. These may be used singly or in combination of two or more kinds thereof.

In the present invention, the resin material preferably contains an inorganic filler. As described above, since the resin material needs to be easily melted at the vulcanization temperature of a tire, a resin material having a softening point or melting point of 150° C. or less needs to be used, and when the softening point, or the melting point of the resin material is low, the strength of a resin filament is reduced, and therefore, at the time of twisting a cord, the resin filament may be broken and productivity may be deteriorated. Therefore, in the present invention, it is preferable to add an inorganic filler to a resin material to improve the strength of a resin filament. By adding the inorganic filler to a resin material, the tackiness on the surface of a resin filament is reduced, so that there is an advantage that the slip property of the resin filament is further improved and the twisting of a steel cord is facilitated.

The addition amount of an inorganic filler based on 100 parts by mass of a resin component contained in a resin material is preferably 0.1 parts by mass or more, more preferably 0.5 pans by mass or more, further preferably 5 parts by mass or more, and particularly preferably 10 parts by mass or more, and preferably 30 parts by mass or less, and particularly preferably 20 parts by mass or less. When the addition amount of the inorganic filler based on 100 parts by mass of the resin component is less than 0.1 parts by mass, the reinforcing effect of a resin filament is not sufficiently obtained, whereas when the addition amount exceeds 30 parts by mass, the reinforcing effect of the resin filament is saturated, which is not preferable in terms of manufacturing costs, and at the same time, when the dispersibility of the inorganic filler decreases, the durability of the resin filament may be adversely affected.

In the present invention, examples of the inorganic filler include carbon black, silica, aluminum hydroxide, clay, alumina, talc, mica, kaolin, glass balloon, glass bead, calcium carbonate, magnesium carbonate, magnesium hydroxide, magnesium oxide, titanium oxide, potassium titanate, and barium sulfate. These may be used singly or in combination of two or more kinds thereof. Among these, carbon black is preferred from the viewpoint of reinforcing a resin filament. Since a rubber composition that constitutes a tire also usually contains carbon black, by using carbon black as the inorganic filler, the compatibility between the resin filament according to the present invention and the rubber composition constituting a tire is improved, and an improvement in the adhesiveness between the rubber and the resin can be expected.

When carbon black is used, the grade of carbon black is not particularly limited, and any grade can be appropriately selected and used. For example, SRF, GPF, FEF, HAF, ISAF, SAF, or the like used, and particularly preferred examples include GPF, FEF, HAF, ISAF, and SAF, which are excellent in bending resistance and fracture resistance. The nitrogen adsorption specific surface area $N_2SA$ (based on JIS K 6217-2: 2001) is preferably 20 $m^2/g$ or more, and more preferably 25 $m^2/g$ or more, and preferably 150 $m^2/g$ or less, and more preferably 130 $m^2/g$ or less.

In the present invention, the resin material may further contain an acid-modified resin, and among acid-modified resins, a resin modified with an acid anhydride such as dimer acid, maleic acid, or itaconic acid is preferable. A maleic acid-modified resin is preferable since such a resin can improve the adhesiveness to steel filaments. In the present invention, the ratio of an acid-modified resin can be appropriately set as long as the resin material contains at least an ionomer. In order to obtain a favorable balance between an effect of a maleic acid-modified resin and an effect of an ionomer, the mass ratio between the maleic acid-modified resin and the ionomer may be from 1:9 to 9:1, and in consideration of the balance of various performances, the mass ratio is preferably from 4:6 to 6:4. When the ionomer satisfies the lower limit of the above-described mass ratio or more, the slip property of a resin filament at the time of manufacturing is improved in order to promote vulcanization adhesion at the interface between a resin material and a coating material such as rubber during vulcanization, it is preferable to set the degree of neutralization of an ionomer to be high, and to prepare a blend that does not cause vulcanization inhibition on the alkali side.

Examples of the maleic acid-modified resin include maleic anhydride-modified styrene-ethylene-butadiene-styrene block copolymer (SEBS), maleic anhydride-modified ultra-low density polyethylene, maleic anhydride-modified ethylene-butene-1 copolymer, maleic anhydride-modified ethylene-propylene copolymer, maleic anhydride-modified ethylene-octene, and maleic anhydride-modified propylene. Specific examples of commercially available products include Tuftec M1943, M1911, and M1913 manufactured by Asahi Kasci Corporation. Other examples include Admer LB548, NF518, QF551, QF500, and QE060, High wax 4051E, 4252E, and 1105A, and Tuffmer MH7010 and MH7020 manufactured by Mitsui Chemicals, Inc. These may be used singly or in combination of two or more kinds thereof.

Further, the resin material according to the present invention may contain a thermoplastic resin or a thermoplastic elastomer other than the ionomer and the acid-modified resin to such art extent that the above-described effects are not impaired. Still further, various additives such as an antioxidant, an oil, a plasticizer, a color former, and a weathering agent may be contained (blended).

The steel cord 20 according to the present invention is constituted by the plurality of steel filaments 21, and the structure is not particularly limited as long as at least a part thereof is coated with the resin material. Specific examples thereof include a cord having a compact structure in which steel filaments are closest-packed in the cord cross section as shown in FIG. 2 and a cord having a layer-twisted structure such as 3+9+16 structure. In particular, a compact structure is preferable from the viewpoint of improving strength. When there are three or more core filaments, corrosion due to gaps formed between the core filaments is likely to occur, and therefore, the present invention is particularly useful when a steel cord having three or more core filaments, for example, three core filaments is used as a ply cord.

Figure 3:
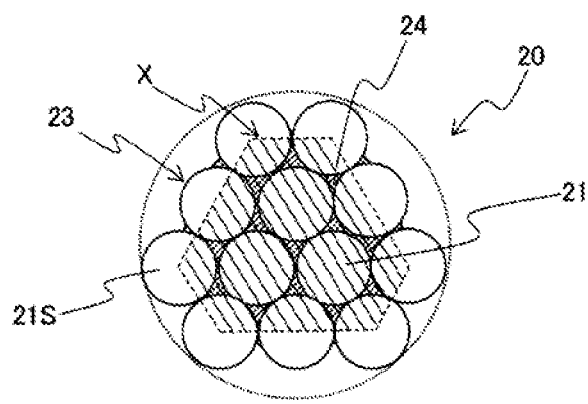
FIG. 3 is an explanatory diagram of a region X surrounded by a line connecting the centers of respective sheath filaments constituting an outermost sheath layer in a cord cross section of a steel cord according to the present invention.

In the present invention, a desired effect can be obtained as long as at least a part of steel filaments constituting a steel cord is coated with a resin material. Preferably, as shown in FIG. 3, in a cord cross section of the steel cord 20, orthogonal to the cord longitudinal direction, when a region occupied by portions other than the steel filament 21 in a region X (hatched portion in the figure) surrounded by a line connecting the centers of the respective sheath filaments 21S constituting the outermost sheath layer (the sheath layer 23 in the figure) is defined as a gap region, a filling rate indicating a ratio of the resin material 24 to the gap region is 52% or more, and particularly 60% or more, and preferably 120% or less, and more preferably 100% or less. When the filling rate of the resin material 24 is 52% or more, it is preferable because the cord untwisting resistance, and the corrosion resistance to water, penetration are further improved. It is noted that the filling rate of the resin material 24 is 100% or more means that the resin material 24 is filled to the outside of the region X, namely, that a portion corresponding to the outer periphery portion of a cord on the surface of each sheath filament 21S constituting the outermost sheath layer is coated with the resin material 24. When the portion corresponding to the outer periphery portion of the cord on the surface of each sheath filament 21S constituting the outermost sheath layer is coated with the resin material 24, the adhesiveness between the card and the coating material such as rubber deteriorates, and therefore, the filling rate of the resin material 24 is preferably 120% or less. When using a resin material that can adhere to a coating material such as rubber as the resin material 24, the filling rate of the resin material 24 may exceed 120%, and for example, the entire sheath filament 21S may be coated with the resin material 24.

In the present invention, as the steel filament, any conventionally used steel filament can be used, and in order to secure the ply strength, it is preferable to use a steel filament having a tensile strength of 2,700 N/mm$^2$ or more. As the steel filament having high tensile strength, a steel filament containing at least 0.72% by mass, particularly at least 0.82% by mass of carbon can be suitably used.

The surface of a steel filament may be plated. The composition of the plating on the surface of the steel filament is not particularly limited, and is preferably brass plating made of copper and zinc, and more preferably has a copper content of 60% by mass or more. As a result, the adhesiveness between a steel filament and a coating material such as rubber can be improved.

In the present invention, the wire diameter of a steel filament and a resin filament and the cord diameter are not particularly limited, and can be appropriately selected according to the type, the size, and the like of a tire. The conditions such as the twist direction and twist pitch, of a steel cord and the end count of the steel cord in a carcass ply are not particularly limited, and can be appropriately designed according to a conventional method. Further, the present invention, the material for coating a steel cord is not particularly limited, and a commonly used material for coating a steel cord such as a thermoplastic resin, a thermosetting resin, a thermoplastic elastomer, a thermosetting elastomer, or a rubber can be appropriately used.

The above-described steel cord as a ply cord in the present invention is obtained by twisting a steel filament and a resin filament made of the above-described resin material, heating the resin filament to a flowable state, and filling a gap between the steel filaments with the resin material.

Specifically, first, a resin filament made of the resin material is manufactured. The resin filament can be manufactured by a known method, and the manufacturing method is not particularly limited. For example, the resin filament can be manufactured by kneading a resin component, such as the ionomer, and the inorganic filler and drawing the obtained resin composition. The resin filament can also be produced by preparing a masterbatch in which a large amount of an inorganic filler is added to a resin component in advance, adding the masterbatch to the resin component to prepare a resin composition containing a predetermined content of an inorganic filler, and stretching the resin composition.

Figure 4:
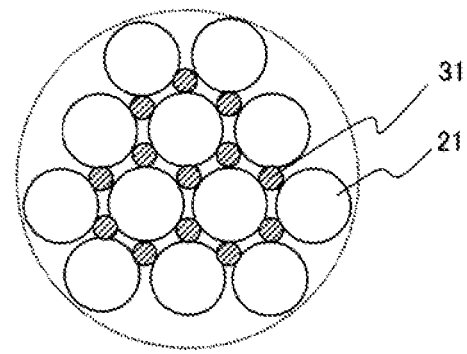
FIG. 4 is an explanatory diagram showing an example of an arrangement state of resin filaments when the steel cord shown in FIG. 2 is manufactured.
Figure 5:
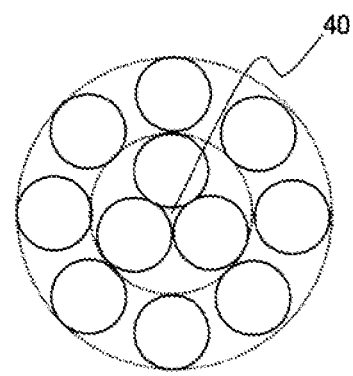
FIG. 5 is a cross-sectional view in the width direction showing a conventional steel card having a 3+8 structure.

The position of a resin filament when twisting a steel filament and the resin filament is not particularly limited as long as the resin material of the resin filament can be filled in a gap between the steel filaments by heating. For example, in the case of a steel cord having a layer-twisted structure, the position of the resin filament is preferably inside the outermost sheath filament, and in the case of a steel cord having a multi-twisted structure, the position of the resin filament is preferably inside the outermost sheath strand or inside the outermost sheath filament of each strand. In the case of the compact structure shown in FIG. 2 described above, since there is a plurality of gaps formed between the three steel filaments 21 in the cross section of the cord, it is preferable to arrange the resin filaments 31 at locations corresponding to the gaps as shown in FIG. 4.

By improving the strength of a resin filament, the steel cord according to the present invention can be manufactured, using a twisting machine generally used for producing steel cords for tires, by twisting together with the resin filament at the time of twisting the steel cord. Therefore, the number of working processes is not increased, and the productivity is not reduced. In order to prevent breakage of a resin filament caused by twisting different materials of a steel filament and the resin filament, it is preferable to use a resin material having as high a strength as possible. The strength of a resin filament can be increased by increasing the drawing magnification during the manufacturing of the resin filament. It is preferable that a resin filament in a twisting machine has good slippage. Here, at the time of twisting, all resin filaments and steel filaments may be twisted in one process, or a part thereof may be twisted in a separate process.

After twisting a steel filament and a resin filament, straightening may be performed on a twisted cord with a straightener. By plastically deforming the resin filament in the straightening process, the stability of the shape as a steel cord can be secured, which is preferable.

The tire of the present invention is obtained by using the above-described twisted cord as a ply cord of a carcass ply. By assembling a green tire and performing vulcanization according to a conventional method, heating during the vulcanization softens a resin filament to a flowable state and fills a gap between steel filaments, whereby at least a part of the steel filaments is covered with a resin material constituting the resin filament. Although, in a state in which the steel filaments and the resin filament are twisted together, the steel filaments are not in a closest-packed state, when tension is applied to the carcass ply during the vulcanization, the steel filaments are arranged in a close-packed state as the resin material flows.

In the present invention, vulcanization conditions such as vulcanization time, temperature, and pressure in the vulcanization process when manufacturing a tire are not particularly limited, and known conditions can be adopted. As a process other than the vulcanization process at the time of manufacturing a tire, a normal tire manufacturing process can be adopted, and there is no particular limitation. For example, in a tire molding process before, a vulcanization process, members needed for forming a tire with a belt layer, a carcass, a bead core, and the like may be prepared, and then these members may be assembled into a single tire using a molding machine to form a green tire, and then vulcanization may be performed.

The present invention, in which a steel cord is used as a ply cord, is usually applied to medium or large tires, and specifically, is useful for heavy load tires such as trucks or buses. The tire of the present invention is not particularly limited except that the above-described steel cord is applied to a carcass ply, and may have a known structure. For example, in the tire shown in FIG. 1, on the outer side of the carcass ply 1 in the tire radial direction of a crown portion, a belt 3 composed of at least four layers inclined in the tire circumferential direction, four layers of a first belt layer 3a, a second belt layer 3b, a third belt layer 3c, and a fourth belt layer 3d in the illustrated example, is arranged. Although not illustrated, a bead filler having a tapered cross section is usually arranged outside the bead core in the tire radial direction. As the gas to be charged into the tire, in addition to normal air or air with adjusted oxygen partial pressure, an inert gas such as nitrogen, argon, or helium can be used.

EXAMPLES

Hereinafter, the present invention will be described in more detail with reference to Examples.

Example 1

By twisting a steel filament having a wire diameter of 0.34 mm and a resin filament having a wire diameter of 0.08 mm, a steel cord having a 12 cc structure as shown in FIG. 4 is produced. The obtained steel cord is coated with a coating rubber to produce a steel cord-rubber composite. The resin filament is prepared by drawing a resin composition A obtained by kneading Tuftec M1943 (softening point: 39° C.) manufactured by Asahi Kasei Corporation as the maleic anhydride-modified SEBS, Himilan 1702 manufactured by Du Pont-Mitsui Polychemicals Co., Ltd. (softening point 90° C.) as the ionomer, and Carbon black (manufactured by Asahi Carbon Co., Ltd., Asahi #55 (GPF)) at the ratio shown in Table 1 below. Compounded rubber shown in Table 2 below is used as the coating rubber.

TABLE 1

| | | Resin composition A | Resin composition B |
|---|---|---|---|
| Compounded amount (parts by mass) | Anhydrous maleic acid-modified SEBS *1 | 50 | — |
| | Ionomer *2 | 50 | 100 |
| | Carbon black *3 | 20 | 15 |
| Softening point or melting point (° C.) | | 90 or less | 90 |

*1 Manufactured by Asahi Kasei Corporation, Tuftec M1943 (Softening point; 39° C.)
*2 Manufactured by Du Pont-Mitsui Polychemicals Co., Ltd., Himilan 1702 (Melting point: 90° C.)
*3 Manufactured by Asahi Carbon Co., Ltd., Asahi #55 (GPF)

TABLE 2

| | Compounded amount (parts by mass) |
|---|---|
| Natural rubber *4 | 100 |
| Carbon black *5 | 60 |
| Cobalt salt *6 | 1 |
| Oxidation zinc | 7.5 |
| Vulcanization accelerator *7 | 1 |
| Sulfur *8 | 6 |
| Antioxidant *9 | 3.5 |

*4 Natural rubber: RSS #3
*5 Carbon black: N326 manufactured by Asahi Carbon Co., Ltd., "Asahi #70L"
*6 Cobalt salt: manufactured by Datnippon Ink and Chemicals, Incorporated, "DICNATE NBC-II"
*7 Vulcanization accelerator: manufactured by Ouchi Shinko Chemical Industrial Co., Ltd.,"Nocceler-DZ" (N,N-diclohexyl-benzothiazolysulfenamide)
*8 Insoluble sulfur: manufactured by Flexsys Inc., trade name "Crystex HS OT 20"
*9 Antioxidant: manufactured by Ouchi Shinko Chemical Industrial Co., Ltd., "Nocrac NS-6"

Examples 2, 3 and Comparative Examples 1 to 4

Steel cord-rubber composites of Examples and Comparative Examples are produced under the conditions shown in Table 3 below. In Examples 2 and 3 and Comparative Example 4, a steel cord is produced using a steel filament and as resin filament in the same manner as in Example 1, and the obtained steel cord is coated with a coating rubber to produce a steel cord-rubber composite. In Comparative Examples 1 to 3, a steel cord was produced using a steel filament, and the obtained steel cord is coated with a coating rubber to produce a steel cord-rubber composite.

Each obtained steel cord-rubber composite is vulcanized at 145° C. for 15 minutes, and the vulcanized steel cord-rubber composite is evaluated as described below. After the vulcanization, a steel filament constituting a steel cord of each Example is at least partially coated with a resin material.

(Test Method for Corrosion Resistance to Water Penetration)

A cord end of a vulcanized steel cord-rubber composite is exposed by polishing, immersed in a 5% by mass saline solution for 2 weeks, and a static corrosion test is performed to measure the length of rust development inside the cord. The test results are described in a table, with the case of rust development of less than 5 mm denoted by ○, the case of rust development of 5 mm or more and less than 50 mm denoted by Δ, and the case of rust development of 50 mm or more denoted by x.

(Cord Untwisting Resistance)

A steel cord-rubber composite after vulcanization is cut with a shearing cutter, and a cord untwisting resistance test is carried out by holding the position about 10 cm from an end of a cord by hand and hitting the end of the cord three times on a desk. The test results are described in a table, with the case of no filaments unraveled denoted by ○, the case of less than half of the outermost sheath filaments unraveled denoted by Δ, and the case of all of the outermost sheath filaments unraveled denoted by x. Δ indicates that the composite has sufficient durability when used as a tire member, and Δ indicates that the composite has further durability.

(Fretting Resistance)

A test is carried out by a belt bending fatigue method in which a sample obtained by embedding three 500 mm long steel cords in an unvulcanized rubber and vulcanizing at 145° C. for 15 minutes in a belt-shaped mold 10 mm wide×6 mm thick×500 mm long is hung at the center thereof on a cylinder having a diameter D where the bending strain of the outer periphery portion of the cord is 1% in a conversion formula according to strain=d/D when the cord diameter is d, and the sample is reciprocated 100,000 times while applying a constant tension at 30 N to both ends of the sample. The test results are described in a table, with the case of no fretting damage between a wrapping filament and the outermost sheath after fatigue or fracture denoted by ○, the case of fretting damage denoted by x.

(Test Method for Adhesive Strength)

For a sample obtained by embedding 210 min long, steel cords at an interval of 2 mm in an unvulcanized rubber and vulcanizing at 145° C. for 15 minutes in a mold 55 mm wide×7 mm thick×210 mm long, the peeling force when a cord end is peeled from the rubber is measured. The peel strength of Comparative Example 1 having the same structure and serving as a reference is set to 100, the peeling force in Examples is indexed with respect to the strength, and 90 or more is determined as an adhesive strength that can be used.

Examples 4 to 6 and Comparative Example 5

Conditions are changed as shown in Table 4 below to produce steel cord-rubber composites of Examples and Comparative Examples. In Examples 4 to 6 and Comparative Example 5, a steel cord is produced using a steel filament and a resin filament in the same manner as in Example 1, and the obtained steel cord is coated with a coating rubber to produce a steel cord-rubber composite.

Each of the obtained steel cord-rubber composites is vulcanized at 145° C. for 15 minutes, and the vulcanized steel cord-rubber composites are evaluated in the same manner as in Example 1. Regarding the adhesive strength, the peel strength in Comparative Example 5 is set to 100, the peeling force in Examples is indexed, and 90 or more is determined as an adhesive strength that can be used. After the vulcanization, a steel filament constituting a steel cord of each Example is at least partially coated with a resin material.

These results are collectively shown in Tables 3 and 4 below.

10) A steel filament having a wire diameter of 0.15 mm is used.

11) A ratio of the resin material to a gap region defined as a region occupied by portions, other than the steel filaments in a region surrounded by a line connecting the centers of respective sheath filaments constituting an outermost sheath layer in a cord cross section orthogonal to the cord longitudinal direction of the steel cord expressed as a percentage.

TABLE 4

| Coating material | Comparative Example 5 Resin composition A | Example 4 Resin composition A | Example 5 Resin composition B | Example 6 Resin composition B |
|---|---|---|---|---|
| Cord structure | 3 + 9 + 16 | 3 + 9 + 16 | 3 + 9 + 16 | 3 + 9 + 16 |
| Wrapping filament *10 | Yes | None | None | None |
| Filling rate (%) *11 | 60 | 60 | 100 | 120 |
| Corrosion resistance to water penetration | ○ | ○ | ○ | ○ |
| Cord untwisting resistance | ○ | ○ | ○ | ○ |
| Fretting resistance | x | ○ | ○ | ○ |
| Adhesive strength (index) | 100 | 100 | 95 | 90 |

As shown in the above Tables, according to a steel cord of each Example that includes no wrapping filament and in which at least a part of a steel filament is coated with a predetermined resin material, it is clear that excellent corrosion resistance to water penetration, cord untwisting resistance, and fretting resistance, and high adhesive strength can be obtained.

TABLE 3

| | Comparative Example 1 | Comparative Example 2 | Comparative Example 3 | Comparative Example 4 | Example 1 | Example 2 | Example 3 |
|---|---|---|---|---|---|---|---|
| Coating material | Rubber | Rubber | Rubber | Resin composition A | Resin composition A | resin composition B | resin composition B |
| Cord structure | 12 cc | 12 cc | 3 + 8 (rubber penetration structure) | 12 cc | 12 cc | 12 cc | 12 cc |
| Wrapping filament *10 | Yes | None | None | Yes | None | None | None |
| Filling rate (%) *11 | 0 | 0 | 60 | 60 | 60 | 100 | 120 |
| Corrosion resistance to water penetration | x | x | Δ | ○ | ○ | ○ | ○ |
| Cord untwisting resistance | ○ | x | Δ | ○ | ○ | ○ | ○ |
| Fretting resistance | x | ○ | ○ | x | ○ | ○ | ○ |
| Adhesive strength (index) | 100 | 100 | — | 100 | 100 | 95 | 90 |

DESCRIPTION OF SYMBOLS

1 Carcass ply
2 Bead core
3 Belt
3a First belt layer
3b Second belt layer
3c Third belt layer
3d Fourth belt layer
10 Tire
11 Tread portion
12 Sidewall portion
13 Bead portion
20 Steel cord
21 Steel filament
21C Core filament
21S Sheath filament
22 Core portion
23 Sheath layer
24 Resin material
31 Resin filament
40 Core inside
X Region surrounded by a line connecting centers of respective sheath filaments constituting outermost sheath layer 10 in cord cross section

The invention claimed is:

1. A tire comprising a carcass ply as a skeleton, wherein the carcass ply is reinforced by a steel cord including no wrapping filament, the steel cord is composed of a plurality of steel filaments having 3 or more core filaments, at least a part of a surface of each of the plurality of steel filaments is coated with a resin material containing at least an ionomer, and when a resin component contained in the resin material is composed of a single resin, a melting point of the resin material is 150° C. or less, and when the resin component is composed of a composition containing two or more resins, a softening point of the resin material is 150° C. or less, and wherein the resin material further contains a resin modified with an acid anhydride.

2. The tire according to claim 1, wherein the steel cord includes a core portion composed of the core filaments and at least one sheath layer arranged on an outer periphery of the core portion, and when a region occupied by portions other than the steel filaments in a region surrounded by a line connecting centers of respective sheath filaments constituting an outermost sheath layer in a cord cross section orthogonal to a cord longitudinal direction is defined as a gap region, a filling rate indicating a ratio of the resin material to the gap region is from 52% to 120%.

3. The tire according to claim 2, wherein the resin material contains an inorganic filler in an amount of from 0.1 parts by mass to 30 parts by mass based on 100 parts by mass of a resin component.

4. The tire according to claim 3, wherein the inorganic filler is carbon black.

5. The tire according to claim 4, wherein a grade of the carbon black is GPF.

6. The tire according to claim 2, wherein the modified resin is a maleic acid-modified resin and/or a dimer acid-modified resin.

7. The tire according to claim 6, wherein a mass ratio of the maleic acid-modified resin to the ionomer is from 4:6 to 6:4.

8. The tire according to claim 1, wherein the resin material contains an inorganic filler in an amount of from 0.1 parts by mass to 30 parts by mass based on 100 parts by mass of a resin component.

9. The tire according to claim 8, wherein the inorganic filler is carbon black.

10. The tire according to claim 9, wherein a grade of the carbon black is GPF.

11. The tire according to claim 9, wherein the modified resin is a maleic acid-modified resin and/or a dimer acid-modified resin.

12. The tire according to claim 11, wherein a mass ratio of the maleic acid-modified resin to the ionomer is from 4:6 to 6:4.

13. The tire according to claim 8, wherein the modified resin is a maleic acid-modified resin and/or a dimer acid-modified resin.

14. The tire according to claim 13, wherein a mass ratio of the maleic acid-modified resin to the ionomer is from 4:6 to 6:4.

15. The tire according to claim 1, wherein the modified resin is a maleic acid-modified resin and/or a dimer acid-modified resin.

16. The tire according to claim 15, wherein a mass ratio of the maleic acid-modified resin to the ionomer is from 4:6 to 6:4.

* * * * *